June 2, 1970 R. L. MAGUIRE 3,515,446
LUBRICATED TRACK ROLLER
Filed Jan. 30, 1969 2 Sheets-Sheet 1
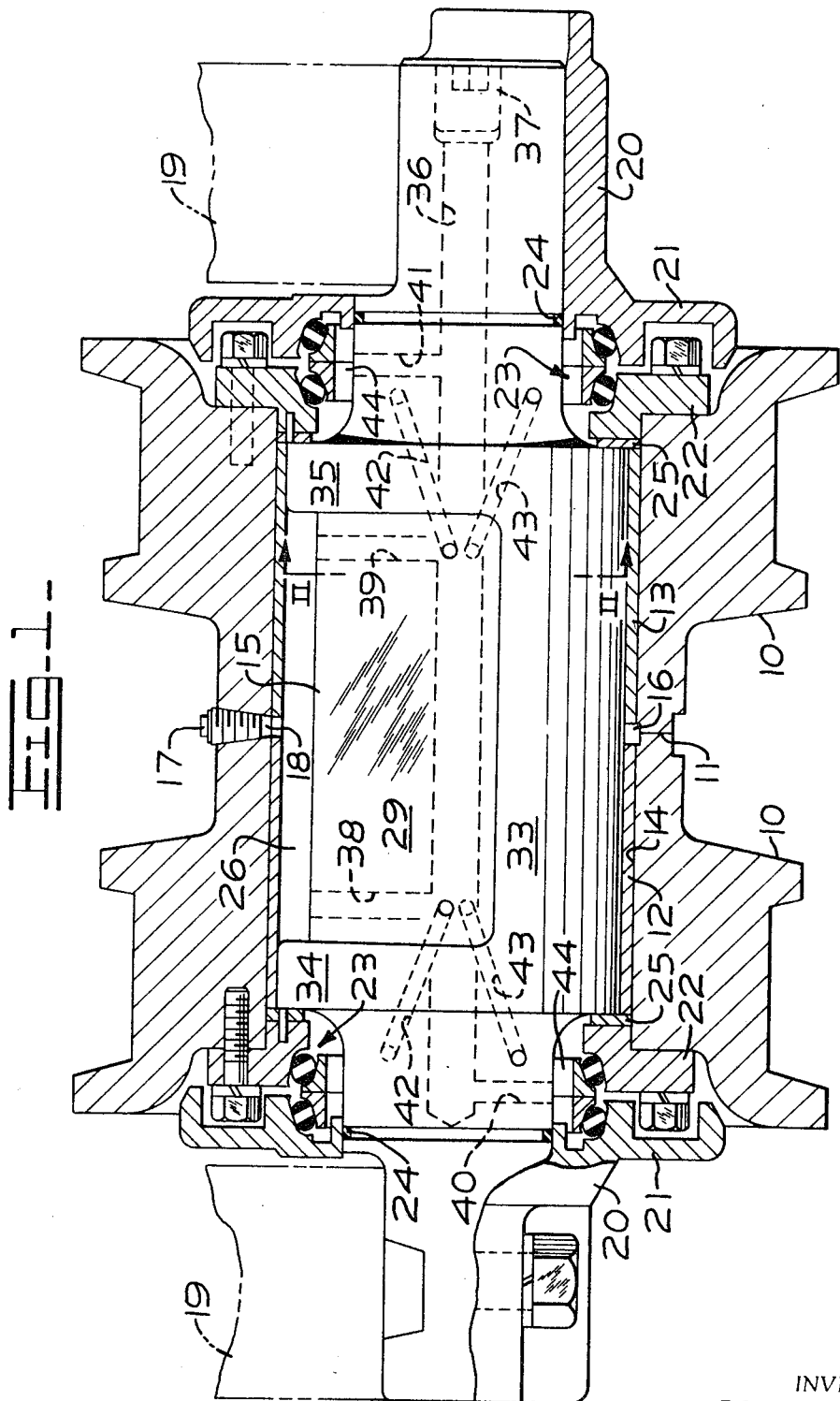
INVENTOR
ROY L. MAGUIRE
ATTORNEYS June 2, 1970 R. L. MAGUIRE 3,515,446
LUBRICATED TRACK ROLLER
Filed Jan. 30, 1969 2 Sheets-Sheet 2
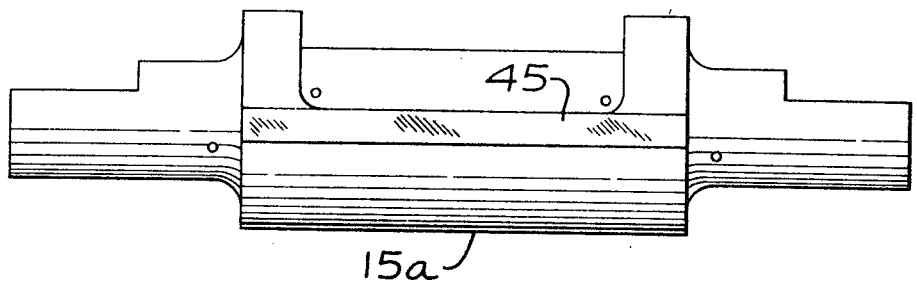
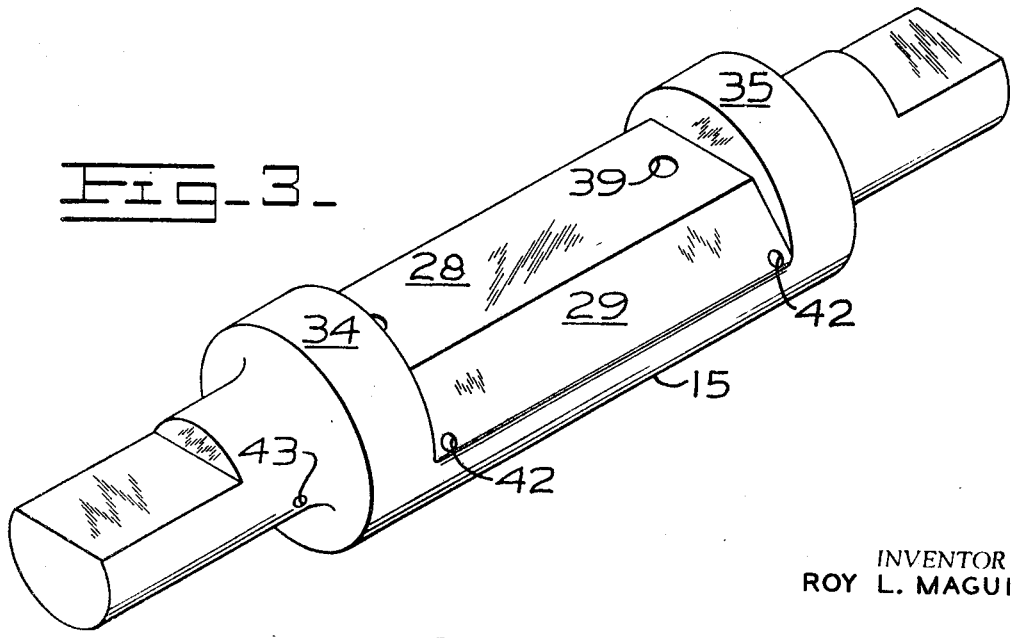
INVENTOR
ROY L. MAGUIRE

United States Patent Office 3,515,446
Patented June 2, 1970

3,515,446
LUBRICATED TRACK ROLLER
Roy L. Maguire, Edelstein, Ill., assignor to Caterpillar Tractor Co., Peoria, Ill., a corporation of California
Filed Jan. 30, 1969, Ser. No. 795,235
Int. Cl. F16c 13/02
U.S. Cl. 308—20    10 Claims

ABSTRACT OF THE DISCLOSURE

A track roller comprises a shaft having a rim assembly rotatably mounted thereon. Lubricating means for the track roller comprises a chamber formed in part by the shaft and passage means for communicating lubricating oil from the chamber to bearings and seals employed in the track roller.

---

The advent of large track-type vehicles has increased the need for a heavy-duty track roller which will exhibit a protracted life expectancy. Such need is particularly apparent when the vehicles are subjected to relatively high speed, earthmoving operations. The track roller's wear life is primarily dictated by its structural integrity and ability to self-lubricate efficiently during operation. For example, undue deflection of the track roller's shaft and insufficient lubrication will induce premature wear of bearing and sealing components employed in the track roller.

An object of this invention is to provide a low-cost and non-complex track roller exhibiting a long wear life. The track roller essentially comprises a cylindrical rim assembly rotatably mounted on a shaft adapted to have its ends secured to the frame of a track-type vehicle, such as a tractor. The shaft forms a semi-cylindrically shaped bearing surface on the shaft's lower portion. Lubricating means for the track roller comprises a recess formed in the upper portion of the shaft to define an oil retaining chamber with the rim assembly.

The chamber forms a wedge-shaped chamber portion at each side thereof terminating at the shaft's bearing surface for hydrodynamically pumping oil from the chamber to the bearing surface upon rotation of the rim assembly. In the preferred embodiment, suitable passage means are formed in the shaft to communicate the chamber with an annular sealing means positioned at each end of the track roller and between the shaft and rim assembly.

Further objects of this invention will become apparent from the following description and accompanying drawings wherein:

FIG. 1 is a cross-sectional view of a track roller embodying novel features of this invention;

FIG. 2 is a cross-sectional view taken on line II—II in FIG. 1 showing a shaft employed in the track roller;

FIG. 3 is an isometric view of the shaft; and

FIG. 4 is a front elevational view illustrating a modified form of the shaft.

The track roller illustrated in FIG. 1 comprises a cylindrical rim assembly comprising a track engaging rim 10 which may constitute two parts welded or otherwise suitably secured together at 11. The rim assembly may further comprise cylindrically shaped and steel-backed bronze sleeve bearings 12 and 13 press-fitted into bore 14 of the rim to rotatably mount the rim assembly on a shaft 15. The term "rim assembly" as used herein may be understood to mean the illustrated rim and sleeve bearing combination or other suitable component combinations which may include an additional hub (not shown) or bushing (not shown).

The bearings are preferably spaced apart to form an annular chamber 16 for lubrication purposes hereinafter explained. A plug 17 may be removably attached to the rim to expose a charging port 18 for selectively filling the track roller with a standard lubricating oil. However, it has been found that the utilization of such a plug is optional, i.e., chamber 16 may be otherwise filled as will be hereinafter explained.

Shaft 15 is secured at its reduced ends to frame 19 of a track-type vehicle in a conventional manner. A bracket 20 is secured to the frame and shaft at each side of the track roller and has an annular plate portion 21 formed thereon. The plate portion cooperates with an annular plate 22 secured to rim 10 to aid in retaining annular sealing means or floating metal ring seal assemblies 23 therebetween. Such a sealing means is fully disclosed in U.S. Pat. No. 3,180,648 for "Seals," assigned to the assignee of this application.

An annular seal 24 preferably of the elastomeric type, may be arranged in a groove formed in shaft 15 to abut plate 21 in the manner illustrated to cooperate with sealing means 23 for retaining lubricating fluid within the track roller. It should be further noted that an annular thrust bearing 25 of the washer type is positioned between plate 22 and the shaft and sleeve bearing 12 to further aid in preventing relative axial movements from occurring as between the shaft and rim assembly. It should be noted that the above described constructions 19–25 are duplicated at each side of the track roller.

The lubricating means for the track roller comprises a large chamber 26 adapted to be filled with lubricating oil. The chamber is defined in part by a recess having a substantially crescent-shaped cross-section (FIG. 2) formed in the upper, mid-portion of the shaft. The arcuate, inner surface portions of the rim assembly further define such chamber. Referring to FIGS. 2 and 3, such recess is preferably defined by intersecting flat surface portions 27, 28 and 29.

Although horizontally disposed top surface 28 and converging side surfaces 27 and 29 facilitate expeditious fabrication, it should be understood that other chamber shapes may be employed. For example, it should be noted in FIG. 2 that such recess may be defined by the phantom lined, arcuate configuration shown at 30. If so desired, the included angle of the wedge-shaped chamber portions, defined in part by surfaces 27 and 29, can be made even smaller at their apexes by relieving such surfaces at 31 and 32.

Bearing surface 33 preferably extends approximately 180° on the underside or lower portion of the shaft to afford a large and uninterrupted bearing surface area for track rolling purposes. It should be noted in FIG. 2 that the widths of surfaces 27–29 are shown as being substantially equal and that the included angle $a$ between converging surfaces 27 and 29 approximates 75°. Such angle may be varied within a range of from 50° to 100° and the extent of bearing surface 33 varied within a range of from 90° to 270°, depending on the particular track roller application under consideration.

Shoulders 34 and 35, preferably formed integrally with the shaft, function to further increase the effective bearing surface area of the track roller by merging with bearing surface 33. The shoulders also aid in defining chamber 26 therebetween. The upper surface portions of such shoulders function to axially and radially locate the rim assembly on the shaft and will substantially aid in supporting the weight of the rim assembly and track (not shown), particularly when the track loses ground contact.

Chamber 26 is preferably charged with a lubricating oil via a passage 36 formed on the central, longitudinal axis of the shaft. The passage may be normally closed by a removable plug 37 although, as above stated, plug 17 comprises an alternative filling means. Branch passages 38 and 39 communicate lubricating oil to the chamber whereas branch passages 40 and 41 will communicate such oil to the two sealing means 23.

If so desired, pairs of passages 42 and 43 may be suitably drilled through the shaft in the manner shown. Each pair of passages will function to communicate chamber 26 with a smaller chamber 44 formed adjacent the sealing means for assuring positive lubrication thereat. In particular, it should be noted that the passages communicate with chamber 26 at the apex of the wedge-shaped portions thereof to induce an increased oil pressure to readily communicate oil to the sealing means.

FIG. 4 illustrates a modification of the FIGS. 2 and 3 shaft wherein an additional flat surface portion 45 has been formed, preferably on each side of the shaft, to be coextensive with bearing surface 33. Such additional surface portions are preferably further arranged to intersect surfaces 27 and 29, respectively. This arrangement further aids in directing lubricating oil over the full length of bearing surface 33 and to thrust bearings 25.

As above suggested, a number of advantageous results accrue from novel features employed in the above described track roller embodiment. For example, the relatively large bearing surface 33 employed in the integrated construction affords maximum support to the rim assembly and attendant endless tracks (not shown). The uninterrupted, semi-circular bearing surface remains undisturbed by any conventional oil ports or grooves which would normally function to create large area oil films and other disadvantages detrimental to efficient track roller operation. In addition, shoulder portions 34 and 35 increase the effect overall bearing surface area and aid in preventing undue shaft deflections in the manner described above. Further desiderata reside in the uniquely integrated track roller components which may be readily fabricated, assembled and disassembled for servicing purposes.

Regarding lubrication features, it has been found that the tapered or wedge-shaped chamber portions, formed in part by surfaces 27 and 29 in FIG. 2, function to create an advantageous oil pressure differential to hydrodynamically pump oil to the bearing surfaces during all phases of vehicle operation. Annular chamber 16 is suitably sized to circulate and return a substantial portion of the lubricating oil from the bearing surface back to chamber 26. It has been further found, pursuant to teachings of this invention, that oil tends to readily flow axially along bearing surface 33 (FIG. 1). Thus, positive lubrication of the entire bearing surface, as well as thrust bearings 25, is assured even when a vehicle is working in extreme side hill conditions, for example, with the roller assembly tilted severely relative to its illustrated horizontal position. The continuous circulation of lubricating oil over all bearing surfaces assures maximum cooling and a long life expectancy for the track roller.

What is claimed is:

1. In a track roller comprising a cylindrical rim assembly rotatably mounted on a shaft, said shaft forming a substantially large, semi-cylindrically shaped bearing surface on the lower portion thereof, lubricating means comprising recessed surface portions formed in the upper portion of said shaft to define a substantially large chamber with said rim assembly having a substantially crescent-shaped cross-section adapted to retain lubricating oil therein, said chamber when viewed in cross-section forming a wedge-shaped chamber portion at each side thereof, each chamber portion terminating at an apex thereof at said bearing surface for hydrodynamically pumping and coating said bearing surface with a film of lubricating oil upon rotation of said rim assembly on said shaft.

2. The invention of claim 1 wherein said shaft further comprises spaced, cylindrical shoulders formed thereon to have the outer surfaces thereof engage said rim assembly and to merge with said bearing surface, said recessed surface portions formed between said shoulders.

3. The invention of claim 1 further comprising annular sealing means at each end of said track roller between said rim assembly and said shaft for preventing lubricating oil from escaping thereby, said lubricating means further comprising passage means for communicating lubricating oil from said chamber to each of said sealing means.

4. The invention of claim 1 wherein said rim assembly comprises a cylindrical rim having a cylindrical, two-part sleeve bearing mounted in a bore thereof, the two parts of said sleeve bearing spaced from each other to form an annular chamber communicating with said large chamber.

5. The invention of claim 1 wherein said recessed surface portions comprise a horizontally disposed top surface and converging side surfaces, the included angle between said side surfaces selected from the range of from 50° to 100°.

6. The invention of claim 5 wherein said included angle approximates 75° and said semi-cylindrically shaped bearing surface extends approximately 180° on the lower portion of said shaft.

7. The invention of claim 1 further comprising annular sealing means of the floating ring type positioned at each end of said track roller and passage means for communicating lubricating oil from said chamber to said sealing means.

8. The invention of claim 7 wherein said passage means comprises at least one passage formed in said shaft and communicating with said chamber at the apex of at least one of the wedge-shaped chamber portions thereof.

9. The invention of claim 1 wherein said recessed surface portions comprise an arcuate configuration.

10. The invention of claim 1 further comprising a flat surface portion formed on each side of shaft to be coextensive with respect to said bearing surface and to intersect said recessed surface portions.

References Cited

UNITED STATES PATENTS

| 1,879,839 | 9/1932 | Bown et al. | 308—18 XR |
| 2,480,095 | 8/1949 | Buchi | 250—116 |
| 2,690,933 | 10/1954 | Bechman | 308—18 |
| 2,926,968 | 3/1960 | Toth | 308—18 XR |
| 3,147,048 | 9/1964 | Johnson et al. | 308—18 |
| 3,386,782 | 6/1968 | Magil et al. | 308—107 XR |

MANUEL A. ANTONAKAS, Primary Examiner

U.S. Cl. X.R.

184—27; 308—109